(12) United States Patent
Shaw et al.

(10) Patent No.: US 11,677,463 B2
(45) Date of Patent: Jun. 13, 2023

(54) INFRASTRUCTURE INTEGRITY AND ATTESTATION OF AN ALL-PHOTONICS NETWORK

(71) Applicant: DELL PRODUCTS, LP, Round Rock, TX (US)

(72) Inventors: Rowland Shaw, Chester, NH (US); Qing Ye, Hopkinton, MA (US); Said Tabet, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/490,506

(22) Filed: Sep. 30, 2021

(65) Prior Publication Data

US 2022/0345212 A1   Oct. 27, 2022

Related U.S. Application Data

(63) Continuation-in-part of application No. 17/241,951, filed on Apr. 27, 2021, now Pat. No. 11,388,493.

(51) Int. Cl.
*H04B 10/071* (2013.01)
*H04B 10/077* (2013.01)

(52) U.S. Cl.
CPC ....... *H04B 10/071* (2013.01); *H04B 10/0771* (2013.01)

(58) Field of Classification Search
None
See application file for complete search history.

(56) References Cited

U.S. PATENT DOCUMENTS

| | | | |
|---|---|---|---|
| 8,948,589 B2 | 2/2015 | Smith et al. | |
| 9,673,897 B2 | 6/2017 | Prause | |
| 10,783,472 B2 | 9/2020 | Carpenter et al. | |
| 2017/0244518 A1 | 8/2017 | Singh et al. | |
| 2020/0072703 A1* | 3/2020 | Roux | G01M 11/3145 |
| 2020/0092026 A1* | 3/2020 | Birk | H04L 45/08 |
| 2020/0350986 A1* | 11/2020 | Ahadian | H04B 10/07955 |
| 2021/0048369 A1* | 2/2021 | Noguchi | G01M 11/3136 |
| 2021/0223139 A1* | 7/2021 | Hveding | G01M 11/3145 |

* cited by examiner

*Primary Examiner* — Darren E Wolf
(74) *Attorney, Agent, or Firm* — Larson Newman, LLP

(57) ABSTRACT

A data communication network includes a network node and a processor. The network node includes an optical link and a reflectometry analyzer to provide a plurality of reflectometry results, each reflectometry result providing a characterization of physical and operational properties of the optical link at the time of the reflectometry result. The processor receives a first set of the reflectometry results, and calculates a federated fingerprint of the physical and operational properties of the optical link based on the plurality of fingerprints in first set of the reflectometry results. The federated fingerprint is a combination of fingerprints from every section of the optical link. The processor receives a second set of the reflectometry results, and compares each of a plurality of fingerprints in the second set of reflectometry results with a respective corresponding fingerprint in the federated fingerprint. The processor determines whether a physical tampering of the optical link has occurred based upon the comparison.

18 Claims, 7 Drawing Sheets

INFRASTRUCTURE INTEGRITY AND ATTESTATION OF AN ALL-PHOTONICS NETWORK

CROSS-REFERENCE TO RELATED APPLICATION

This application is a continuation-in-part of U.S. patent application Ser. No. 17/241,951 entitled "Secure and Attested All-Photonics Network," filed on Apr. 27, 2021, the disclosure of which is hereby expressly incorporated by reference in its entirety.

Related subject matter is contained in co-pending U.S. patent application Ser. No. 17/490,550 entitled "IDENTIFYING LINK FINGERPRINT ANOMALIES IN REAL-TIME IN AN ALL-PHOTONICS NETWORK," filed Sep. 30, 2021, the disclosure of which is hereby incorporated by reference.

Related subject matter is contained in co-pending U.S. patent application Ser. No. 17/490,617 entitled "IDENTIFYING OPTIMAL PATHS IN AN ALL-PHOTONICS NETWORK," filed Sep. 30, 2021, the disclosure of which is hereby incorporated by reference.

Related subject matter is contained in co-pending U.S. patent application Ser. No. 17/490,706 entitled "PATH MANAGEMENT FOR TIERED SERVICE LEVEL AGREEMENTS IN AN ALL-PHOTONICS NETWORK," filed Sep. 30, 2021, the disclosure of which is hereby incorporated by reference.

Related subject matter is contained in co-pending U.S. patent application Ser. No. 17/490,864 entitled "REAL-TIME HEALTH MONITORING IN AN ALL-PHOTONICS NETWORK," filed Sep. 30, 2021, the disclosure of which is hereby incorporated by reference.

FIELD OF THE DISCLOSURE

This disclosure generally relates information handling systems, and more particularly relates to verifying infrastructure integrity and attestation of an all-photonics networking in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A data communication network includes a network node and a processor. The network node includes an optical link and a reflectometry analyzer to provide a plurality of reflectometry results, each reflectometry result providing a characterization of physical and operational properties of the optical link at the time of the reflectometry result. The processor may receive a first set of the reflectometry results, and calculate a federated fingerprint of the physical and operational properties of the optical link based on the plurality of fingerprints in first set of the reflectometry results. The federated fingerprint may be a combination of fingerprints from every section of the optical link. The processor may receive a second set of the reflectometry results, and compare each of a plurality of fingerprints in the second set of reflectometry results with a respective corresponding fingerprint in the federated fingerprint. The processor may determine whether a physical tampering of the optical link has occurred based upon the comparison of the each of the fingerprints in the second set of reflectometry results with the respective corresponding fingerprint in the processed federated fingerprint and combined with other cable operating parameters such as the monitoring of the power-supply feeding the cable repeater units.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
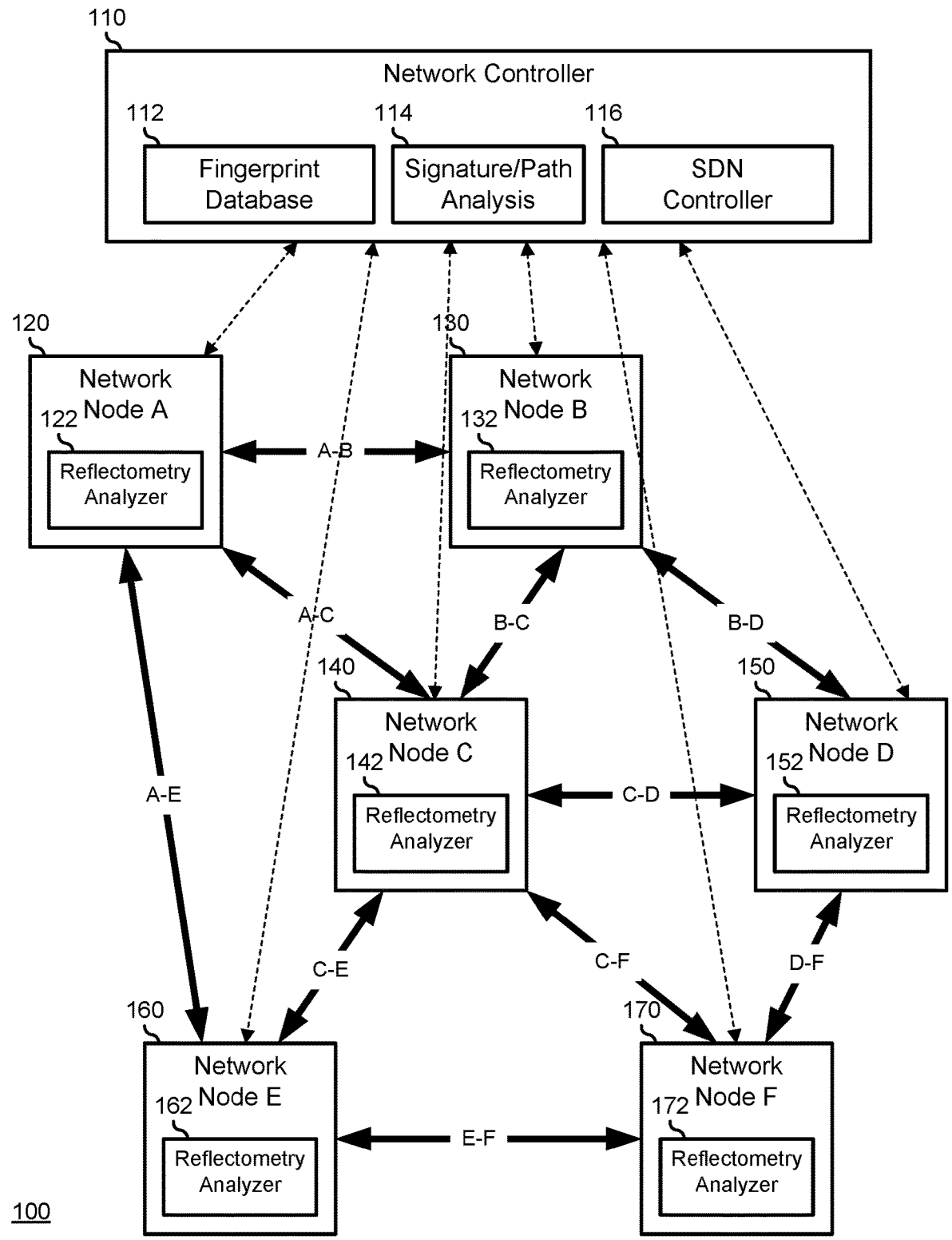
FIGS. 1-3 illustrate an all-photonics network according to an embodiment of the current disclosure.

FIG. 1 illustrates an all-photonics network 100 including a network controller 110 and network nodes 120, 130, 140, 150, 160, and 170. Network controller 110 includes a fingerprint database 112, a signature and path analysis module 114, and a Software Defined Network (SDN) controller 116. Nodes 120, 130, 140, 150, 160, and 170 each include respective reflectometry analyzers 122, 132, 142, 152, 162, and 172. All-photonics network 100 is characterized by the fact that the links between nodes 120, 130, 140, 150, 160, and 170 are all optical-based network links, such as where communications between the nodes is carried by fiber-optic links.

All-photonics network 100 may represent a regional network where the links between nodes 120, 130, 140, 150, 160, and 170 are single-mode fiber optic links that may include embedded repeaters as needed or desired, or may represent a more local network where the links between the nodes are multi-mode fiber optic links. One or more of nodes 120, 130, 140, 150, 160, and 170 may represent network routing and switching devices, where the data transmitted over all-photonics network 100 is received from and sent to other devices that utilize the data. For example, the data transmitted over all-photonics network 100 may represent data transmitted between different datacenters. One or more of nodes 120, 130, 140, 150, 160, and 170 may also represent data processing systems or have dedicated data processing capacities as needed or desired.

The data transmitted via all-photonics network 100 may be understood to be directed from a source node to a target node, and may, under various routing protocols, such as a Border Gateway Protocol (BGP), an Open Shortest Path First (OSPF) protocol, an Intermediate System to Intermediate System (IS-IS) protocol, or the like, be directed via various routing paths and through different nodes in the all-photonics network, based upon the traffic volume, or other conditions on the all-photonics network, as needed or desired. As such, SDN controller 116 operates to manage the switching and routing functions of nodes 120, 130, 140, 150, 160, and 170 to ensure that all-photonics network 100 provides reliable data communication between the nodes. For example, SDN controller 116 and nodes 120, 130, 140, 150, 160, and 170 may implement an OpenFlow architecture to permit the remote management of the switching and routing functions of the nodes by the SDN controller.

Reflectometry analyzers 122, 132, 142, 152, 162, and 172 represent capabilities associated with the links between nodes 120, 130, 140, 150, 160, and 170. In particular, reflectometry analyzers 122, 132, 142, 152, 162, and 172 operate to send test signals, modulated light pulses, down the links, to receive backscattered light from the links, and to analyze the backscattered light to determine the physical characteristics of the links. In a particular embodiment, for example where all-photonics network 100 represents a widely dispersed network that utilizes single mode optical fibers, reflectometry analyzers 122, 132, 142, 152, 162, and 172 may represent optical time domain reflectometry (OTDR) capabilities that analyze the attenuation of the backscattered light from the links to determine the spatial location of discontinuities in the optical fibers.

In another embodiment, for example where all-photonics network 100 represents a more closely spaced network that utilizes multi-mode optical fibers, reflectometry analyzers 122, 132, 142, 152, 162, and 172 may represent optical frequency domain reflectometry (OFDR) capabilities that provide a swept frequency test signal to determine the spatial arrangement of strain, temperature, and other characteristics of the associated links. In yet another embodiment, reflectometry analyzers 122, 132, 142, 152, 162, and 172 may represent other types of capabilities within respective nodes 120, 130, 140, 150, 160, and 170 to collect reflected, refracted, scattered or other backward propagated light that functions to characterize the optical links from connector surfaces, splices, and other fiber impurities along the optical links, as needed or desired. Further, it will be understood that reflectometry analyzers 122, 132, 142, 152, 162, and 172 may represent separate capabilities within respective nodes 120, 130, 140, 150, 160, and 170, or may be integrated with the respective nodes, as needed or desired. The details of reflectometry and of OFDR and OTDR capabilities is known in the art, and will not be further described herein except as needed to illustrate the current embodiments.

The inventors of the current disclosure have understood that reflectometry analysis capabilities like reflectometry analyzers 122, 132, 142, 152, 162, and 172 are typically utilized in all-photonics networks when a new fiber optic cable is installed to characterize the fiber optic cable. If issues arise with the data transmission over that fiber optic cable, then the reflectometry analysis will be performed again. Then the newly determined characteristics for the particular fiber optic cable can be compared with the original characteristics to determine the nature and location of the issues in the fiber optic cable. It has been further understood that, for any particular fiber optic cable, the results of a reflectometry analysis will be unique to that particular fiber optic cable, and that no other fiber optic cable will display an identical reflectometry analysis result. For example, no two fiber optic cables will have splices, connectors, and imperfections at the exact spatial locations within the fiber optic cables as each other. As such, each fiber optic cable will demonstrate a unique reflectometry analysis result, like unto a fingerprint. Hence, each fiber optic cable will hereinafter be understood to have a unique reflectometry analysis fingerprint.

In a particular embodiment, reflectometry analyzers 122, 132, 142, 152, 162, and 172 operate to continuously monitor the associated optical links to generate a real time fingerprint for each optical link. For example, where a particular optical link represents a single mode fiber optic cable, the associated reflectometry analyzer 122, 132, 142, 152, 162, or 172 may operate to halt data transmission over that optical link for a short duration, and generate a reflectometry analysis fingerprint for that optical link, and then resume data transmission on that optical link. In another example, a sensing signal provided by reflectometry analyzers 122, 132, 142, 152, 162, and 172 may share optical links such that no interruption of the data transmission is necessary. For example, reflectometry analyzers 122, 132, 142, 152, 162, and 172 may provide pulses on a continuous basis by using a wavelength division multiplexing (WDM) channel or a 'live traffic' narrowband dense wavelength division multiplexing (DWDM) channel to provide an 'inband' testing of an optical cable. The generation of the reflectometry analysis may be performed periodically, such as once per minute, hourly, daily, weekly, or on another periodic basis as needed or desired, so that the amount of time needed for generating the reflectometry analysis fingerprint is proportionally small.

In another example, where a particular optical link represents a multi-mode fiber optic cable, the associated reflectometry analyzer 122, 132, 142, 152, 162, or 172 may utilize a particular light frequency that is reserved for generating continuous reflectometry fingerprints for that optical link. Here, any major changes in the fingerprints can be instantly detected and flagged for further analysis, as needed or desired. In either case, reflectometry analyzers 122, 132, 142, 152, 162, and 172 operate to communicate the fingerprints for each of the optical links to fingerprint database 112 for analysis by signature and path analysis module 114, as described below.

Figure 2:
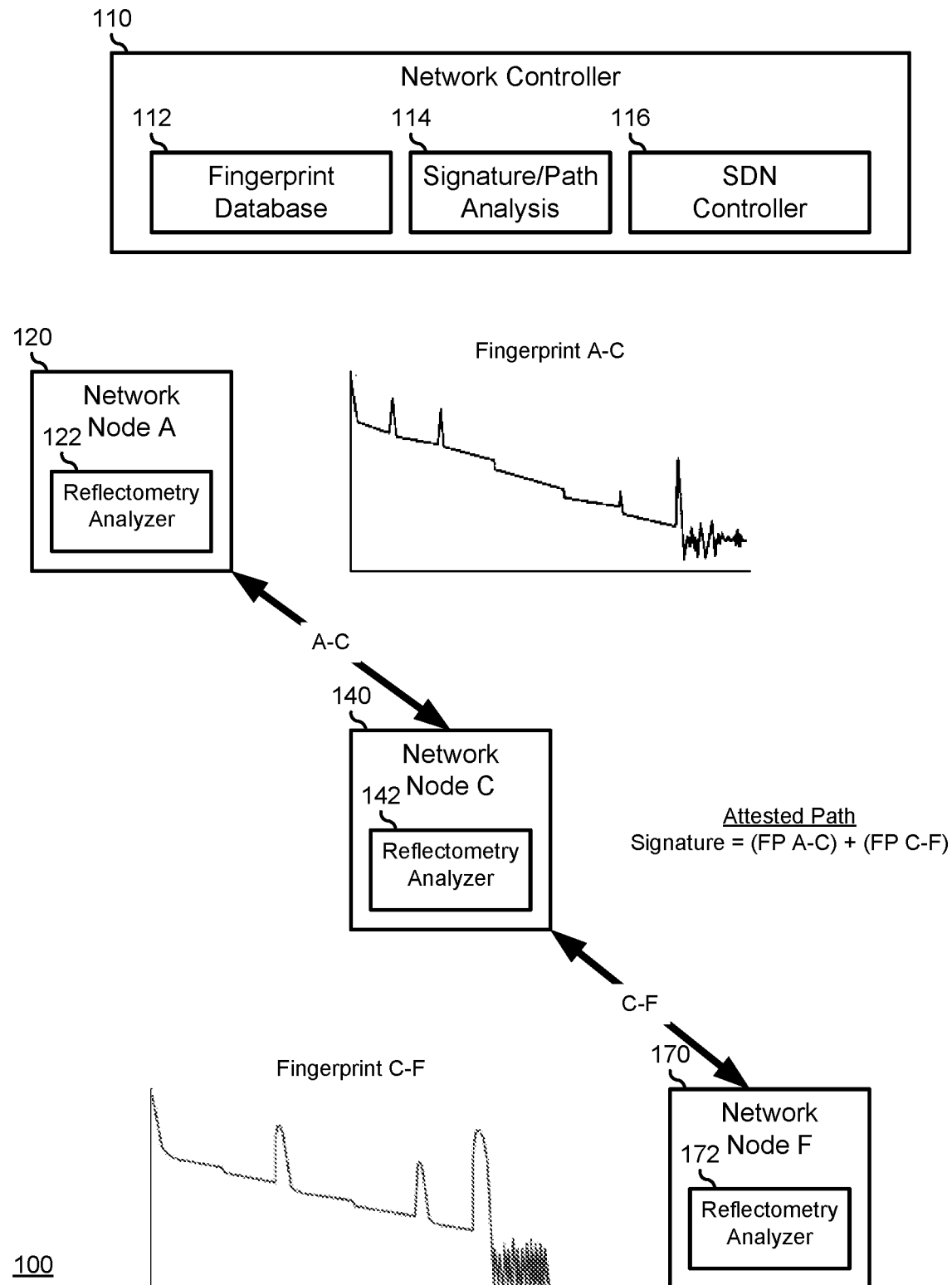

In a particular embodiment, all-photonics network 100 operates to provide validated end-to-end paths between nodes 120, 130, 140, 150, 160, and 170 based upon the fingerprints of the optical links between the nodes. For example, FIG. 2 illustrates all-photonics network 100 with a validated path between nodes 120 and 170, where the path includes the optical link between node 120 and node 140 (optical link A-C) and the optical link between node 140 and node 170 (optical link C-F). Here, reflectometry analyzer 122 provides a fingerprint (Fingerprint A-C) for the optical link from node 120 to node 140 to fingerprint database 112, and reflectometry analyzer 142 provides a fingerprint (Fingerprint C-F) for the optical link from node 140 to node 170.

Signature and path analysis module 114 receives a request to provide a data path between nodes 120 and 170. Signature and path analysis module 114 determines a path that includes node 140. Here, signature and path analysis module 114 may utilize network usage information to determine the path from node 120 through node 140 to node 170, or the path may be provided as a dedicated path to the service of a particular need, such as a client dedicated path, a flow-based dedicated path, a service-level agreement (SLA) based dedicated path, a datacenter-to-datacenter dedicated path, or another dedicated path as needed or desired. Once the path is selected, signature and path analysis module 114 operates to direct SDN controller 116 to establish the network switching such that all data transmissions targeted to the dedicated path are switched in accordance with the path.

Signature and path analysis module 114 then operates to retrieve the most recent fingerprints for the selected optical links (that is Fingerprint A-C and Fingerprint C-F) from fingerprint database 112 and defines a path signature that combines the fingerprints. Thus the signature for the dedicated path between node 120 and node 170 includes Fingerprint A-C and Fingerprint C-F. It will be understood that the reverse path can be similarly validated with reflectometry analyzer 172 providing a fingerprint (for example, Fingerprint F-C, not illustrated), and reflectometry analyzer 142 providing a fingerprint (for example, Fingerprint C-A, not illustrated), as needed or desired. However, if the forward and reverse data is transmitted on a common optical link, such as where the data transmission is provided as time domain multiplexing communications over a common fiber optic cable, the reverse path fingerprints may need to be separately determined from the forward path fingerprints. In any case, the continuous reflectometry analysis of the optical links by reflectometry analyzers 122, 142, and 172 will be provided to fingerprint database 112.

Figure 3:
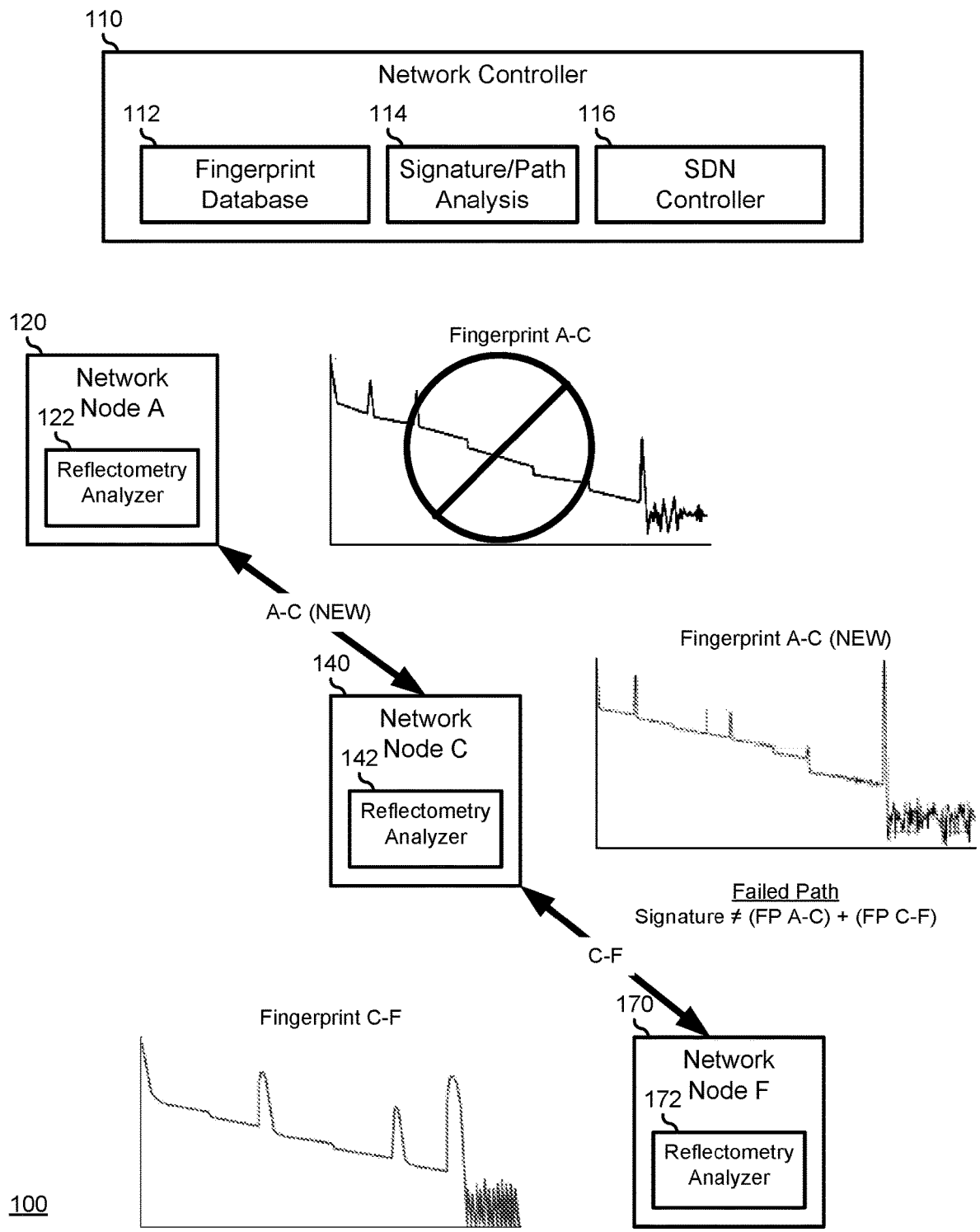

Signature and path analysis module 114 operates to continuously validate that the selected path has not been physically altered in any way, such as by reconfiguring the switching functions of network nodes 120, 130, 140, 150, 160, and 170, or by changing the physical connection of optical fibers to a port of the nodes. For example, in FIG. 3, reflectometry analyzer 122 detects a new fingerprint (Fingerprint A-C(NEW)) on the optical link between node 120 and node 140, and provides the new fingerprint to fingerprint database 112. Upon receiving the new fingerprint at fingerprint database 112, signature and path analysis module 114 analyzes the new fingerprint and determines that it is different from the prior fingerprint for the optical link between node 120 and node 140, and that thus the signature for the entire path between node 120 and node 170 has changed.

In the normal course of operation, the fingerprints for the optical links of all-photonics network 100 will experience a degree of drift over time, resulting from environmental changes in the optical links (temperature, pressure, strain, etc.), aging of the optical links, and the like. Here, signature and path analysis module 114 operates to determine if a change in a fingerprint for the optical links are within expected norms, and are thus not indicative of tampering or changing of the optical links or switching paths, or are of such a character or degree as to indicate that the optical links or switching paths have been tampered with. In a particular embodiment, signature and path analysis module 114 includes a machine learning algorithm that operates to characterize changes in the fingerprints as to whether the changes are within the expected norms. An example of a machine learning algorithm may include a linear regression algorithm, a logistic regression algorithm, a decision tree algorithm, a support vector machine algorithm, a naïve Bayes algorithm, a k-nearest neighbor algorithm, a k-means algorithm, a random forest algorithm, a dimensionality reduction algorithm, a gradient boosting algorithm, or the like.

Upon determining that a change in a fingerprint for the optical links is of such a character or degree as to indicate that the optical link or switching path has been tampered with, signature and path analysis module 114 operates to flag the path as having failed the validation. Here, signal and path analysis module 114 may operate to generate an error indication that can be provided to an error management system for all-photonics network 100 that can provide a work ticket for a network administrator to physically verify the interconnections between the nodes and the optical links, or to take other actions to isolate and repair the path. Network controller 110 acts to halt the data flows over the failed path to ensure that the data flows are not in any way compromised and remain secure, and acts to validate a new path as needed or desired. Here, the establishment and maintenance of the path may be provided in accordance with a service level agreement (SLA) with the user of the path, and so there may be contractual obligations to ensure a level of security for the data flows.

A complete halt of such data flows may be more desirable than the potential of a security breach, and so signature and path analysis module 114 may perform a complete shutdown of such flows over the compromised path until an alternative path can be validated. Finally signature and path analysis module 114 operates to establish and validate a new path for the data flows between the desired nodes. Here, where fingerprint database 112 includes the fingerprints for all of the optical links, the establishment and validation of a new path may be a simple matter of analyzing new path options, selecting the new path, and directing SDN controller 116 to establish the new path. However, where a new path can not be created with the existing data in fingerprint database 112, signature and path analysis module 114 may direct reflectometry analyzers 122, 132, 142, 152, 162, and 172 to analyze new optical links to determine a new path, as needed or desired.

As depicted herein, the fingerprints (for example, Fingerprint A-C, Fingerprint A-C (NEW), and Fingerprint C-F) are illustrated as simplistic line traces that result from a single analysis cycle of the associated reflectometry analyzers 122 and 142. That is, the illustrated fingerprints are depictions of the backscatter traces received by reflectometry analyzers 122 and 142 from a single issuance of the test signal (for example, an ODTR or ODFR trace) by each reflectometry analyzer. It has been understood by the inventors of the current disclosure that, in the real-world situation, no two analysis cycle results for a given optical link will be identical due to the varying conditions on the optical link. For example, a typical optical link may be subject to various displacement events, atmospheric events, or other events that impact the precise profile of the analysis cycle results, and such impacts are significantly randomized from one analysis cycle to the next.

Displacement events may include vibrations in the ground surrounding a buried optical link, such as where a optical link is buried under a roadway where vehicle traffic on the roadway induces vibrations into the optical link, vibrations in a sub-sea optical link where ocean waves or storms may induce vibrations into the optical link, vibrations in either a terrestrial or sub-sea optical link due to seismic events, or other vibrations or shocks experienced by any portion of an optical link. Atmospheric events may include changes in the temperature, pressure, or humidity in the atmosphere surrounding all or a portion of the optical link. As a result, the direct product of the continuous monitoring of an optical link may be chaotic, and not subject to direct interpretation to extract the fingerprint, and additional analysis is therefore needed to extract the fingerprint for each optical link.

Figure 4:
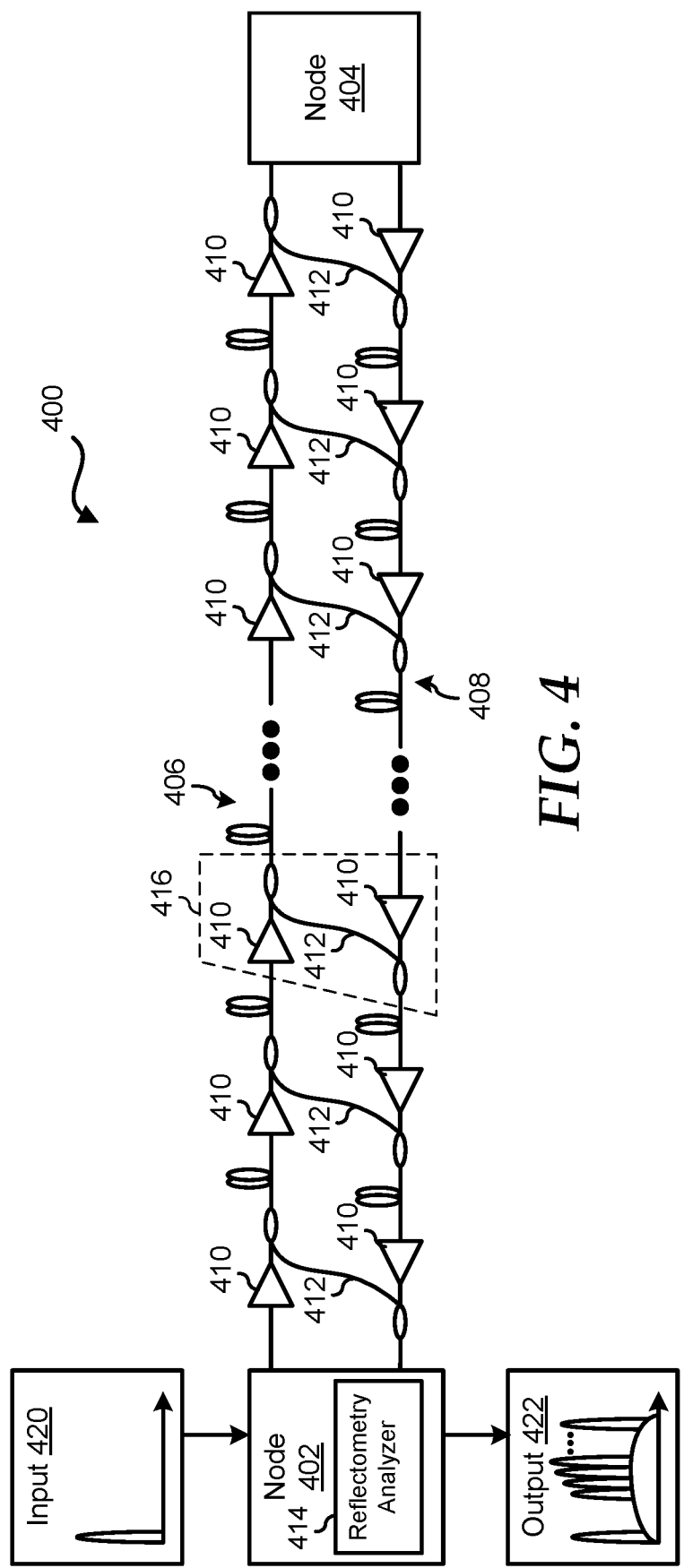
FIG. 4 illustrates a typical long haul all-photonics network according to an embodiment of the current disclosure.

FIG. 4 illustrates a typically deployed long haul all-photonics network 400 according to an embodiment of the current disclosure. Long haul all-photonics network 400 includes nodes 402 and 404, which in turn may communicate via fiber cables 406 and 408. Cables 406 and 408 include multiple amplifiers 410, and multiple physical feedback components 412. In an example, amplifiers 410 may be optical amplifiers deployed at regular intervals along cables 406 and 408. Amplifiers 410 may be any suitable type of amplifier including, but not limited to, an erbium-doped fiber amplifier (EDFA). In certain examples, a particular amplifier section 416 may include one or more amplifiers 410 and a feedback component 412. In an example, cables 406 and 408 may be referred to as optical links. Node 402 includes a reflectometry analyzer 414. Reflectometry analyzer 414 may be hardware circuitry within node 402. In an example, long haul all-photonics network 400 may include additional components over those shown in FIG. 4 without varying from the scope of this disclosure.

In certain examples, long haul all-photonics network 400 may be deployed as a submarine optical cable network. In previous submarine optical cable networks, the cable may be vulnerable to tapping of the fiber cable based on the long length of the cable. A 'tapping attack' of long haul all-photonics network 400 may compromise the data, such as sensitive data, transmitted along cables 406 and 408. Long haul all-photonics network 400 may be improved by reflectometry analyzer 414 of node 402 continually analyzing a series of fingerprints for each section of cables 406 and 408. A section of cable 406 may include the portion of cable between two subsequent amplifiers 410. In an example, the series of fingerprints may be referred to as a federated optical fingerprint. Feedback component 412 in each amplifier section 416 may enable fingerprints for each section of cables 406 and 408 to be determined. The series of fingerprints or federated optical fingerprint may be complied from the fingerprints of the sections of cables 406 and 408.

In an example, node 402 may extract the federated optical fingerprint of the entire network 400 in any suitable manner. For example, node 402 may provide a pulse signal, such as input 420, along cable 406 and receive the federated optical fingerprint, such as output 422, via cable 408. Node 402 may provide the input pulse 420 on a continuous basis in any suitable manner, such as using a 'live traffic' narrowband dense wavelength division multiplexing (DWDM) channel of cable 406. In response to the input pulse 420 being provided along cable 406, each amplifier section 416 may provide a fingerprint for a section of cable 406 associated with the amplifier section. In an example, the fingerprint for each section of cables 406 and 408 may be different from the fingerprints of the other sections of the cables, and these fingerprints may be complied as federated optical fingerprint 422. Each section of cables 406 and 408 may have a different fingerprint based on any suitable factors including, but not limited to, slight differences in the characteristics of the piece of glass along that section. For example, the characteristics of the pieces of glass may be doping, bends in the glass, or the like.

In an example, node 402 may provide a high power supply voltage along cable 406, and may monitor an amount of current delivered by the high power supply voltage. During a normal operation of network 400, each amplifier 410 along cable 406 may receive the same amount of current. However, a change in the amount of current delivered by the high power supply voltage supply in node 402 may indicate an intrusion along cable 406, which may be provided to reflectometry analyzer 414.

In an example, node 402 may provide a high power supply voltage along cable 406, and each amplifier section 416 may monitor an amount of current received from the high power supply voltage and amplifier 410 within the amplifier section. During a normal operation of network 400, each amplifier 410 along cable 406 may receive the same amount of current. However, a change in the amount of current detected within a particular amplifier section 416 may indicate a change in a section of cable 406 associated with that particular amplifier section. In an example, changes in the amount of received current may be provided as feedback with the section fingerprint by each amplifier section 416.

In an example, reflectometry analyzer 414 may continuously monitor federated optical fingerprint 422 and any detected variations in received amounts of current along cables 406 and 408. Reflectometry analyzer 414 may utilize the feedback data for cables 406 and 408 to determine a long-term average of federated optical fingerprint 422. In certain examples, reflectometry analyzer 414 may determine whether any abrupt or significant changes in the feedback data are received. For example, reflectometry analyzer 414 may compare current federated optical fingerprint 422 to the long-term average to determine whether an abrupt variation in the federated optical fingerprint is detected. In an example, reflectometry analyzer 414 may utilize the abrupt variations determine whether an intrusion has occurred along cables 406 and 408 of network 400 as will be described with respect to FIG. 5 below.

Figure 5:
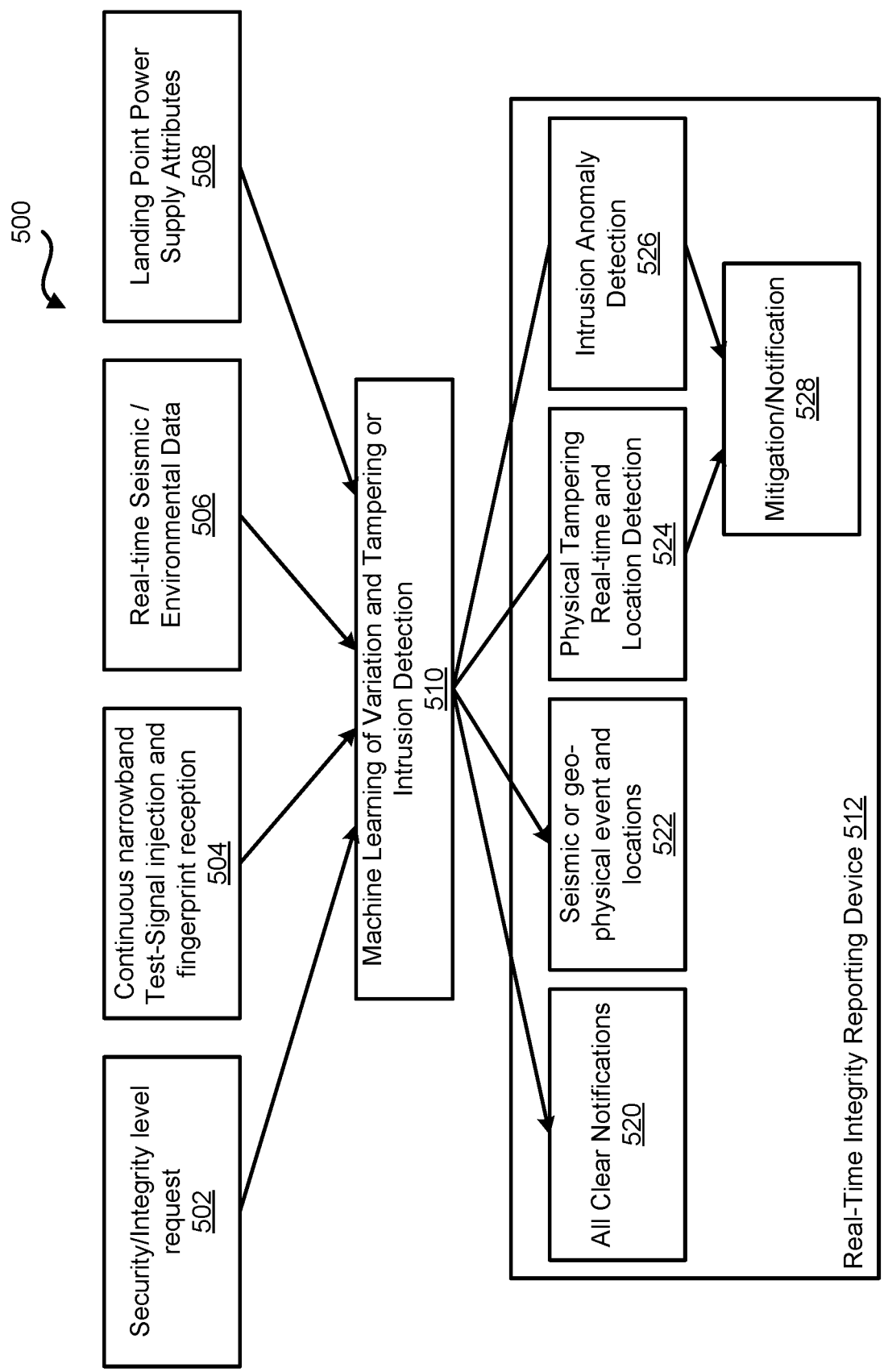
FIG. 5 operations performed within a reflectometry analyzer system of a node in a long haul all-photonics network according to an embodiment of the current disclosure.

FIG. 5 illustrates operations performed within a reflectometry analyzer system 500 of a node in a long haul all-photonics network according to an embodiment of the current disclosure. Reflectometry analyzer system 500 may receive multiple inputs 502, 504, 506, and 508, a machine learning device 510 may perform one or more operations on the inputs, and provide one or more outputs via a real-time integrity reporting device 512. Reporting device 512 may provide multiple outputs 520, 522, 524, 526, and 528. In certain examples, machine learning device 510 and reporting device 512 may be different components within reflectometry analyzer system 500, as shown in FIG. 5, or may be combined within a single device without varying from the scope of this disclosure. In an example, reflectometry analyzer system 500 may include additional components and operations over those shown in FIG. 5 without varying from the scope of this disclosure. Reflectometry analyzer system 500 may be any suitable hardware device including, but not limited to, a processor, such as processor 702 of FIG. 7.

In an example, reflectometry analyzer system 500 may receive suitable data to determine whether a network cable has been tampered with, such that an intrusion into the networks is detected. For example, the input data may include a security/integrity level request 502, a continuous narrowband test-signal injection and fingerprint reception 504, real-time seismic/environmental data 506, and landing point power supply attributes 508.

Security/integrity level request 502 may be any request received from an individual/administrator or an automated controller of the optical network identifying a particular level of security or integrity to maintain only the cable of the optical network. Continuous narrowband test-signal injection and fingerprint reception 504 may be any suitable set of operations to detect a federated optical fingerprint for the network, such as the operations described above with respect to FIG. 4. In an example, the test signal may be injected into the optical network in any suitable manner, such as an in-band signal that is simultaneous to and parallel with the transmission data. In this example, the test signal may be provided at a different wavelength from the other data transmitted to prevent the test signal from interfering with the data transmission. Real-time seismic/environmental data 506 may be any data associated with natural events that may affect the cable in the optical network. For example, real-time seismic/environmental data 506 may be data identifying an earthquake near the optical network, temperature changes around the cables of the network, storms near the network, or the like. In an example, landing point power supply attributes 508 may include any suitable data for the supplied power at a particular amplifier of the optical network. For example, landing point power supply attribute 508 may include an amount of current provided to a particular optical amplifier or the multiple amplifiers across the cable span, the voltage level at the optical amplifiers, or the like. Security/integrity level request 502, test-signal injection and fingerprint reception 504, real-time seismic/environmental data 506, and landing point power supply attributes 508 may be provided to machine learning device 510.

In an example, machine learning device 510 may utilize input 502, 504, 506, and 508 to determine variations or anomalies in the inputs overtime and detect whether an intrusion of a cable in the optical network has occurred. Machine learning device 510 may analyze the feedback data, such as federated optical fingerprint 422 of FIG. 4, and may continuously receive the fingerprints of the different sections of the cable in the optical network. In an example, if a fingerprint variation from one fingerprint to the next for a particular section of the cable is smaller than a particular threshold, machine learning device 510 may variation as an acceptable variation and store the new fingerprint in a table or other database for later reference.

If machine learning device 510 merely detects slow or slight fluctuations in the fingerprints of the sections in the cable and detects constant power supply voltage attributes for the amplifiers along the cable, machine learning device 510 may provide all clear notifications 520 to real-time integrity reporting device 512. Machine learning device 510 may detect a possible physical tampering of the cable in the optical network. In an example, a possible physical tampering may be detected based on machine learning device 510 detecting a change in an amount of power drawn by any section of the cable of the optical network, detecting a high, drastic, or distinct change in any one of feedback fingerprints from the cable of the optical network, or the like.

In an example, machine learning device 510 may perform one or more operations to determine a location of the possible tampering. For example, machine learning device 510 may utilize the table of fingerprints to determine a particular section of the cable associate with the feedback fingerprint having a drastic fluctuation. As stated above, each section of the cable may have a different fingerprint, such that machine learning device 510 may determine the exact section of the cable with the fluctuation of the fingerprint based on the fingerprint that has changed while the fingerprints for the other section may remain the same. In certain examples, tampering of the cable may cause a particular section to bend and/or vibrate, which in turn may cause a change in the fingerprint for that section of the cable. In an example, machine learning device 510 may utilize landing point power supply attributes 508 to determine a particular amplifier or section of cable before the particular amplifier that has changed the amount of power drawn.

After determining a particular section of the cable associated with the possible tampering, machine learning device 510 may compare the location of the section of cable with real-time environmental data 506 to determine whether the possible tampering detection may be correlated with an environmental event in the same area. For example, if a storm, an earthquake, an abrupt change in temperature, or the like has occurred at or near the location of the possible tampering, machine learning device 510 may provide reporting device 512 with a notification 522 that the possible tampering is a result of an environmental event and no action is required.

In an example, machine learning device 510 may determine that the possible tampering is not associated with an environmental event. In this situation, machine learning device 510 may provide reporting device 512 with a physical tampering detection notification 524 and/or an intrusion anomaly detection notification 526. In an example, physical tampering detection notification 524 may include data indicating a time that the tampering occurred and the location of the tampering.

Reporting device 512 may utilize the tampering notification 524 and intrusion anomaly detection 526 to determine a mitigation action or notification 528. In an example, mitigation action or notification 528 may include any suitable operation to prevent the tampering of the cable in the optical network from compromising the data transmitted along the cable. For example, mitigation action or notification 528 may include, but is not limited to, flagging the tampering event, re-routing data to another optical cable, provide feedback information to a company or organization associated with the optical network. Based on notifications 520, 522, 524, and 526, reporting device 512 may provide any suitable data including, but not limited to, governance certificates with fingerprint metadata, commercial platform control, environmental events, physical tampering and locations, intrusion detection, and company/organization notifications. In certain examples, the notifications and other outputs from reporting device 512 may be provided in real-time based on the continuous injection of the test pulse on the cable of the optical network.

In an example, the governance certificates with fingerprint metadata may verify the integrity of the cable within the optical network. These certificates may allow the network operator to provide premium services with secure paths to customers and other users. Additionally, the output notifications from reporting device 512 may enable an administrator of the optical network to perform proactive maintenance on the cable based on the notifications providing performance and characteristics of each segment along the cable. In an example, the fingerprints of the different sections of the cable may be utilized as security keys for information transmitted along the optical network. For example, data may be verified by a node in the optical system based on a federated fingerprint received with the data matching a stored federated fingerprint as calculated and stored by machine learning device 510.

Figure 6:
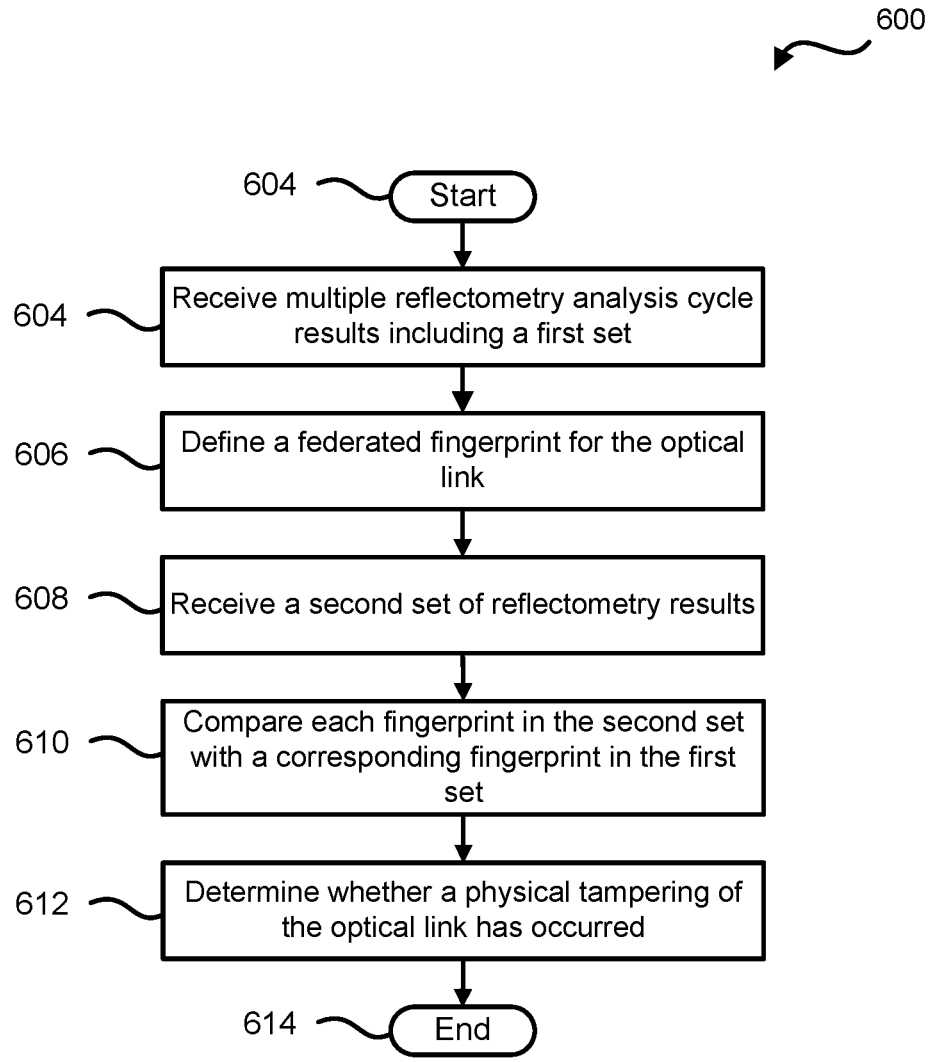
FIG. 6 is a flow chart illustrating a method for establishing and maintaining a secure and attested optical link according to an embodiment of the current disclosure.

FIG. 6 illustrates a method 600 for establishing and maintaining a secure and attested optical link according to at least one embodiment of this disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, the components of network node 402 of FIG. 4, the components of reflectometry analyzer system 500 of FIG. 5, or any other type of system, controller, device, module, processor, or any combination thereof, operable to employ all, or portions of, the method of FIG. 6.

A processor such as a reflectometry analyzer or a signature path analysis module receives multiple reflectometry analysis cycle results for a particular optical link in block 604. The processor utilizes various machine learning techniques to analyze the first set of reflectometry results to define a federated fingerprint of the physical and operational properties of the optical link in block 606. In an example, the federated fingerprint is a combination of fingerprints from each of a plurality of sections of the optical link.

The processor receives a second set of the reflectometry results in block 608. The processor compares each of a plurality of fingerprints in the second set of reflectometry results with a corresponding fingerprint in the federated fingerprint in block 610. The processor determines whether a physical tampering of the optical link has occurred based upon the comparison of the each of the fingerprints in the second set of reflectometry results with the respective corresponding fingerprint in the federated fingerprint in block 612 and the method ends at block 614.

Figure 7:
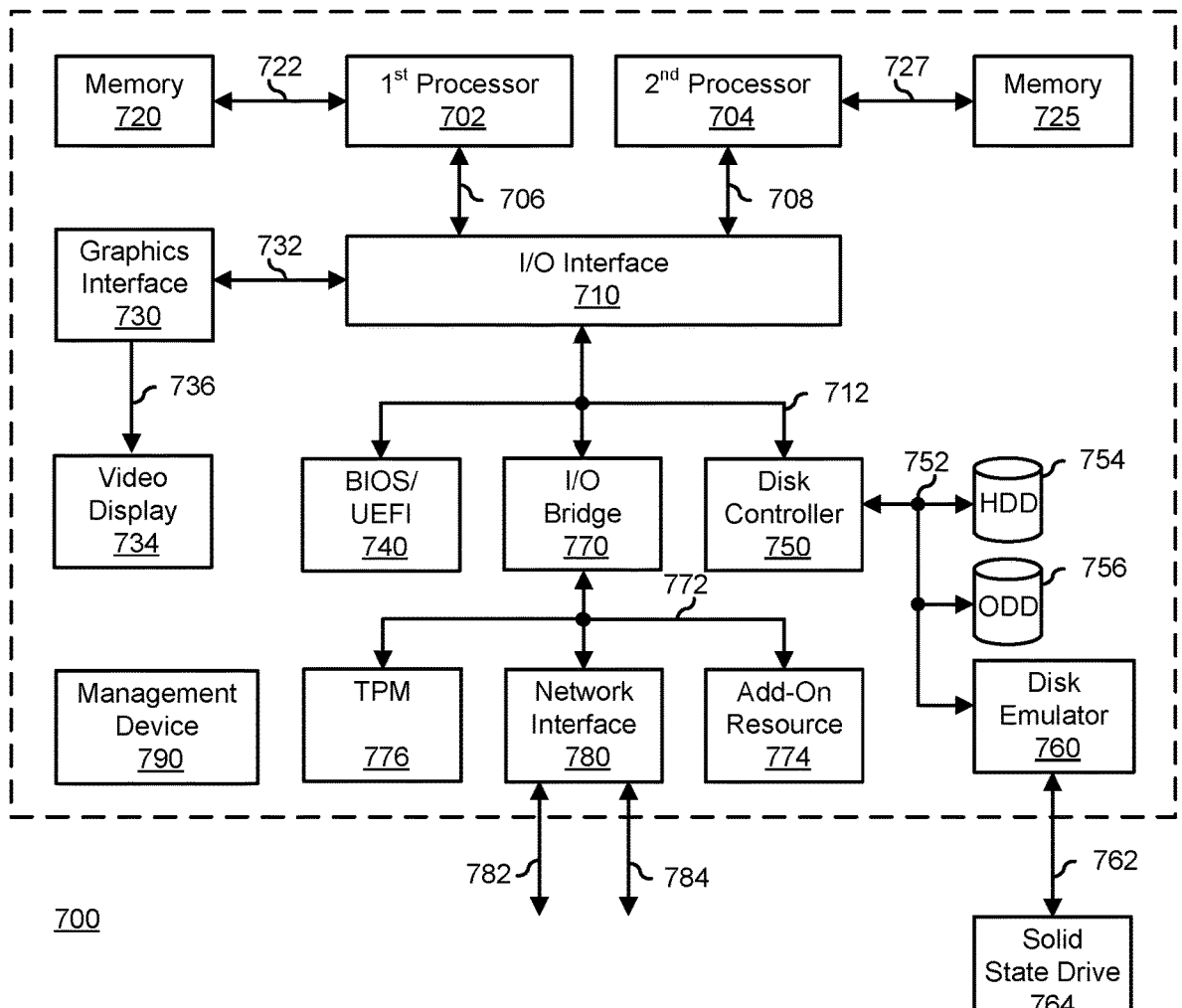
FIG. 7 is a block diagram illustrating a generalized information handling system according to another embodiment of the current disclosure.

FIG. 7 illustrates a generalized embodiment of an information handling system 700. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below, and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 764, an I/O bridge 770, one or more add-on resources 774, a trusted platform module (TPM) 776, a network interface 780, and a management device 790. Processors 702 and 704, I/O interface 710, memories 720 and 725, graphics interface 730, BIOS/UEFI module 740, disk controller 750, HDD 754, ODD 756, disk emulator 760, SSD 764, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732, and provides a video display output 736 to a video display 734. In a particular embodiment, information handling system 700 includes separate memories that are dedicated to each of processors 702 and 704 via separate memory interfaces. An example of memories 720 and 725 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712, or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700. Management device 790 can operate off of a separate power plane from the components of the host environment so that the management device receives power to manage information handling system 700 when the information handling system is otherwise shut down. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data communication network, comprising:
a network node including an optical link and a reflectometry analyzer configured to provide a plurality of reflectometry results, each reflectometry result providing a characterization of physical and operational properties of the optical link at the time of the reflectometry result; and
a processor configured to:
receive a first set of the reflectometry results, wherein the first set of the reflectometry results includes a first plurality of fingerprints for a plurality of sections of the optical link, the first plurality of fingerprints includes a first fingerprint for a first section of the optical link and a second fingerprint for a second section of the optical link;
calculate a federated fingerprint of the physical and operational properties of the optical link based on the plurality of fingerprints in first set of the reflectometry results, wherein the federated fingerprint is a combination of each of the fingerprints for each respective section of sections of the optical link;

receive a second set of the reflectometry results including a second plurality of fingerprints for the plurality of sections of the optical link;

compare each of the second plurality of fingerprints in the second set of reflectometry results with a respective corresponding fingerprint of the first plurality of fingerprints in the federated fingerprint;

determine whether a physical tampering of the optical link has occurred based upon the comparison of the each of the fingerprints in the second set of reflectometry results with the respective corresponding fingerprint in the federated fingerprint;

compare a location of the particular section to the locations of the environmental events;

in response to the location of the particular section matching one of the locations of the environmental events, determine that the physical tampering has not occurred; and in response to the location of the particular section not matching one of the locations of the environmental events, determine that the physical tampering has occurred.

2. The data communication network of claim 1, wherein the processor utilizes a machine learning algorithm to calculate the federated fingerprint of the physical and operational properties of each of the sections the optical link based upon the first set of reflectometry results.

3. The data communication network of claim 1, wherein the processor further to determine a particular section of the optical link associated with a possible physical tampering based on a fingerprint for the particular section varying a predetermined amount from a most recent fingerprint for the particular section.

4. The data communication network of claim 3, wherein the processor further to receive data associated with one or more environmental events, wherein the data includes one or more locations of the environmental events.

5. The data communication network of claim 1, wherein, in response to the physical tampering having occurred, the processor is further configured to:

perform a mitigation action to prevent the tampering event on the optical link from compromising data transmitted along the optical link.

6. The data communication network of claim 5, wherein the mitigation action is the processor to re-route data to another optical link.

7. The data communication network of claim 5, wherein, in response to the physical tampering not having occurred, the processor is further configured to:

provide a notification that the possible tampering event is associated with an environmental event and no action is required.

8. The data communication network of claim 1, wherein the network node further to:

provide an input pulse on a continuous basis on the optical link, wherein the first and second sets of the reflectometry results are based on the input pulse.

9. The data communication network of claim 1, wherein the reflectometry analyzer includes the processor.

10. A method, comprising:

providing, on a network node of a data communication network, an optical link and a reflectometry analyzer;

providing, by the reflectometry analyzer, a plurality of reflectometry results, each reflectometry result providing a characterization of physical and operational properties of the optical link at the time of the reflectometry result;

receiving, by a processor of the data communication network, a first set of the reflectometry results, wherein the first set of the reflectometry results includes a first plurality of fingerprints for a plurality of sections of the optical link, the first plurality of fingerprints includes a first fingerprint for a first section of the optical link and a second fingerprint for a second section of the optical link;

calculating a federated fingerprint of the physical and operational properties of the optical link based on the plurality of fingerprints in first set of the reflectometry results, wherein the federated fingerprint is a combination of each of the fingerprints for each respective section of sections of the optical link;

receiving a second set of the reflectometry results including a second plurality of fingerprints for the plurality of sections of the optical link;

comparing each of a plurality of fingerprints in the second set of reflectometry results with a respective corresponding fingerprint in the federated fingerprint;

determining whether a physical tampering of the optical link has occurred based upon the comparison of the each of the fingerprints in the second set of reflectometry results with the respective corresponding fingerprint in the federated fingerprint;

comparing a location of the particular section to the locations of the environmental events;

in response to the location of the particular section matching one of the locations of the environmental events, determining that the physical tampering has not occurred; and in response to the location of the particular section not matching one of the locations of the environmental events, determining that the physical tampering has occurred.

11. The method of claim 10, further comprising:

utilizing a machine learning algorithm to calculate the federated fingerprint of the physical and operational properties of each of the sections the optical link based upon the first set of reflectometry results.

12. The method of claim 10, further comprising:

determining a particular section of the optical link associated with a possible physical tampering based on a fingerprint for the particular section varying a predetermined amount from a most recent fingerprint for the particular section.

13. The method of claim 12, further comprising:

receive data associated with one or more environmental events, wherein the data includes one or more locations of the environmental events.

14. The method of claim 10, wherein, in response to the physical tampering having occurred, the method further comprises:

performing a mitigation action to prevent the tampering event on the optical link from compromising data transmitted along the optical link.

15. The method of claim 14, wherein the mitigation action is the processor to re-route data to another optical link.

16. The method of claim 14, wherein, in response to the physical tampering not having occurred, the method further comprises:

providing a notification that the possible tampering event is associated with an environmental event and no action is required.

17. The method of claim 11, further comprising:
providing an input pulse on a continuous basis on the optical link, wherein the first and second sets of the reflectometry results are computed based on the input pulse.

18. A network node of a data communication network, the network node comprising:
an optical link;
a reflectometry analyzer configured to provide a plurality of reflectometry results, each reflectometry result providing a characterization of physical and operational properties of the optical link at the time of the reflectometry result; and
a processor configured to:
receive a first set of the reflectometry results, wherein the first set of the reflectometry results includes a first plurality of fingerprints for a plurality of sections of the optical link, the first plurality of fingerprints includes a first fingerprint for a first section of the optical link and a second fingerprint for a second section of the optical link;
calculate a federated fingerprint of the physical and operational properties of the optical link based on the plurality of fingerprints in first set of the reflectometry results, wherein the federated fingerprint is a combination of each of the fingerprints for each respective section of sections of the optical link;
receive a second set of the reflectometry results including a second plurality of fingerprints for the plurality of sections of the optical link;
compare each of the second plurality of fingerprints in the second set of reflectometry results with a respective corresponding fingerprint of the first plurality of fingerprints in the federated fingerprint;
determine whether a physical tampering of the optical link has occurred based upon the comparison of the each of the fingerprints in the second set of reflectometry results with the respective corresponding fingerprint in the federated fingerprint;
compare a location of the particular section to the locations of the environmental events;
in response to the location of the particular section matching one of the locations of the environmental events, determine that the physical tampering has not occurred; and
in response to the location of the particular section not matching one of the locations of the environmental events, determine that the physical tampering has occurred; and
in response to the physical tampering having occurred, provide a notification indicating a location of the physical tampering along the optical link.

\* \* \* \* \*